United States Patent [19]

Lengel

[11] Patent Number: 4,810,126
[45] Date of Patent: Mar. 7, 1989

[54] COMPACT OIL SLINGER AND SPRING LOADED RETENTION DEVICE

[75] Inventor: James D. Lengel, Toms River, N.J.

[73] Assignee: Allied-Signal Inc., Morris Township, Morris County, N.J.

[21] Appl. No.: 214,962

[22] Filed: Jul. 5, 1988

[51] Int. Cl.$^4$ .............................................. B25G 3/18
[52] U.S. Cl. ................................ 403/322; 403/349; 403/359; 285/375
[58] Field of Search ................ 403/359, 322, 349; 285/376, 375, 360, 361, 279

[56] References Cited

U.S. PATENT DOCUMENTS

| | | | |
|---|---|---|---|
| 430,420 | 6/1890 | Coulson | 403/349 |
| 2,079,460 | 5/1937 | Marty | 403/349 X |
| 2,157,153 | 5/1939 | Troche | 403/349 X |
| 2,198,905 | 4/1940 | Content | 285/361 X |
| 3,798,701 | 3/1974 | Irwin | 403/349 X |
| 3,854,832 | 12/1974 | Cowper | 403/354 X |

Primary Examiner—Andrew V. Kundrat
Attorney, Agent, or Firm—Howard G. Massung

[57] ABSTRACT

A quick connect apparatus (10) for attaching a stub shaft (14) to a main rotor shaft (16) of a generator. A rotatable retaining device (12) is secured to the end of the main rotor shaft (16) and includes channels (22) which are engaged by pins (30) projecting radially inward from an inner diameter portion of the stub shaft (14). A polgon drive portion (34) extends from the stub shaft (14) and engages a similar shaped polygon opening (18) formed in the end of the main rotor shaft (16) when the stub shaft (14) is attached. A biasing spring (40) is provided between the back of the polygon opening (18) and a recess in the mating polygon drive portion (34) for biasing the stub shaft (14) axially away from the main shaft (16).

9 Claims, 2 Drawing Sheets

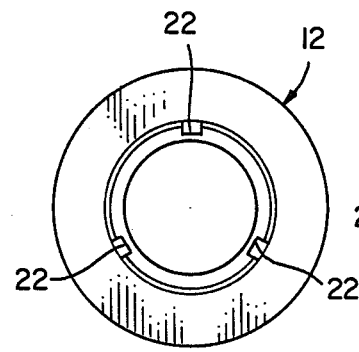
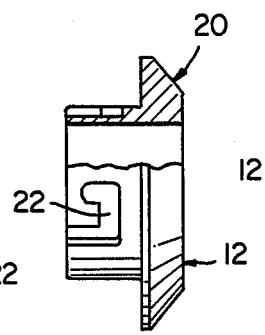
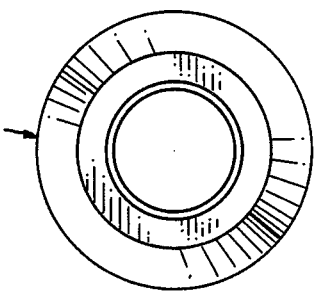
FIG. 3     FIG. 5     FIG. 2
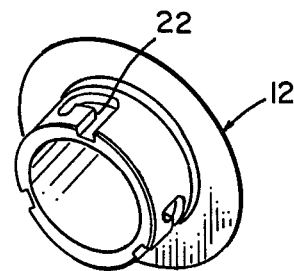
FIG. 4
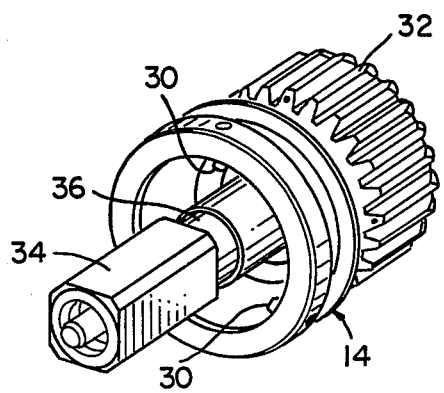
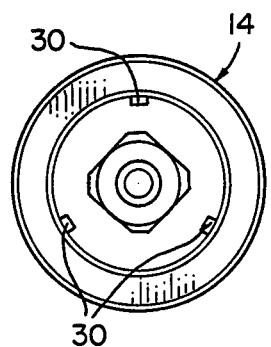
FIG. 7     FIG. 6

COMPACT OIL SLINGER AND SPRING LOADED RETENTION DEVICE

BACKGROUND OF THE INVENTION

1. Field of the Invention

This invention relates to quick disconnect devices and more specifically to a compact oil slinger and spring loaded retention device particularly suitable for an aircraft generator package.

2. Description of the Prior Art

A prior art method of retaining a stub shaft to a main rotor shaft of an AC generator utilizes a threaded bolt or stud which connects to a mating threaded opening in the main rotor shaft. The stub shaft is installed by passing the threaded stud through the stub shaft then securing the threaded stud from the exposed end of the stub shaft. A spring held in place by a washer and nut arrangement, which is attached to the exposed end of the threaded stud, is used for holding the stub shaft to the main rotor shaft. With smaller diameter stub shafts the utilization of a threaded stud or bolt becomes more difficult since a sufficient wall thickness of the stub shaft is required to insure the integrity of the stub shaft for carrying the required torque. Rotary shaft couplings wherein one of the shafts is provided with a coupling pins and the other shaft is provided with mating slots are well known in the art and are exemplified by the following U.S. Pat. Nos.: 430,420; 2,079,460; 2,157,153; 3,798,701 and 3,854,832.

SUMMARY OF THE INVENTION

The disclosed quick retention device is of a compact construction and is formed as part of an oil slinger which is secured to a main rotor shaft. A drive stub shaft is held in place by the quick retention device and is driven by an integral polygon drive which fits into a similar shaped mating opening in the end of the main rotor drive shaft. The stub shaft is spring biased away from the end of the main rotor drive shaft but is held in place by a plurality of pins which engage slots formed in the oil slinger.

BRIEF DESCRIPTION OF THE DRAWINGS

For a better understanding of the invention reference may be had to the preferred embodiment exemplary of the invention shown in the accompanying drawings in which:

FIG. 2 is a view, from one end, of the oil slinger shown in FIG. 1;

FIG. 3 is a view, from the other end, of the oil slinger;

FIG. 4 is an isometric view of the oil slinger;

FIG. 5 is a view, partially in section, of the oil slinger;

FIG. 6 is an end view, looking into the polygon drive element of the stub shaft; and, FIG. 7 is an isometric view of the stub shaft.

DETAILED DESCRIPTION OF THE PREFERRED EMBODIMENT

Figure 1:
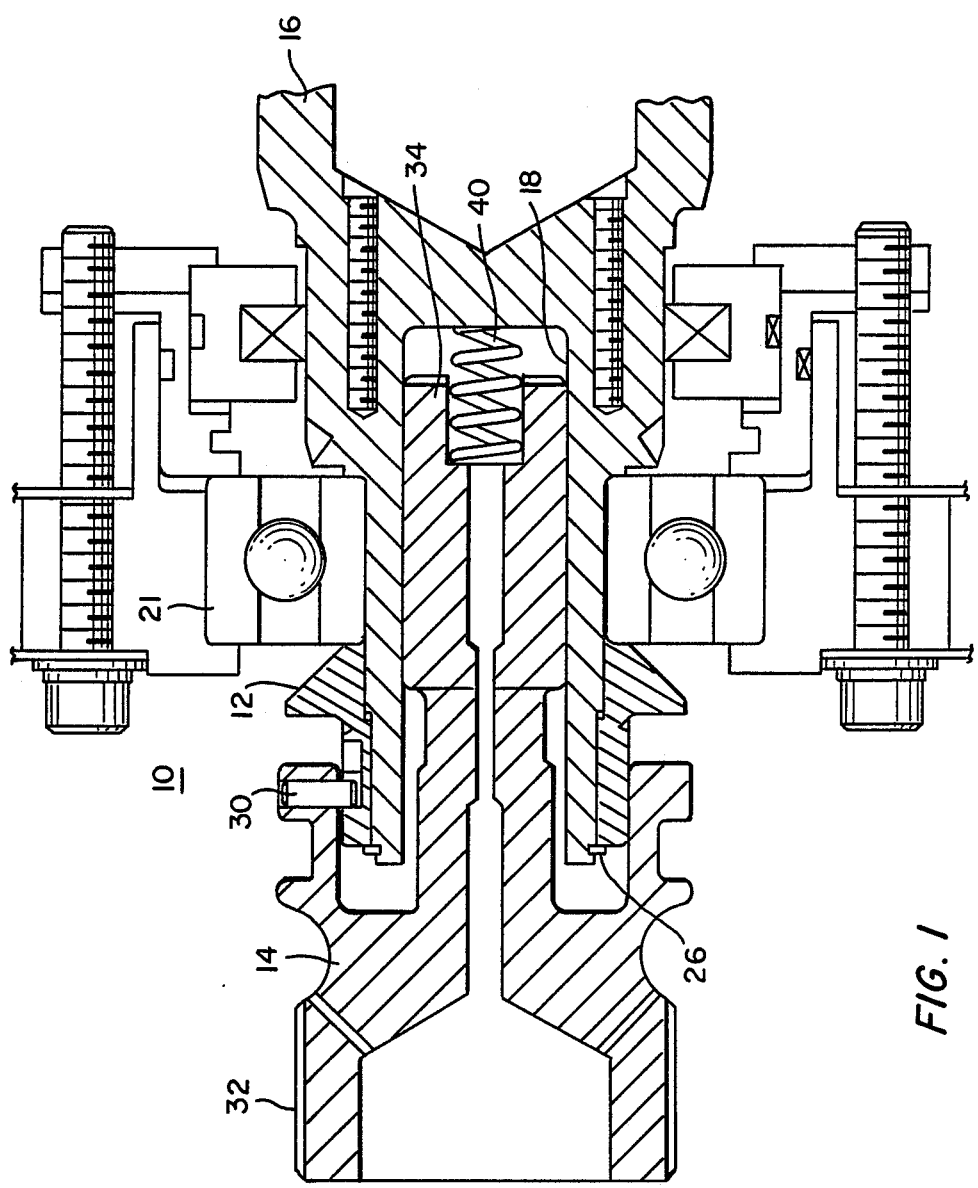
FIG. 1 is a section view of the main rotor drive shaft of an AC generator with an integral spring loaded compact retention device and oil slinger according to the teaching of the present invention.

Refer now to the drawings, there is shown a compact oil slinger and replaceable retaining assembly 10 according to the teaching of the present invention. The arrangement shown is particularly suitable for an AC generator package having high torque transmission requirements. A retainer 10 utilizing the present invention has the advantage of ease of installation and removal. The retention device 10 utilizes an oil slinger 12 which is constructed to retain stub shaft 14. Stub shaft 14 is secured to the main rotor shaft 16 of an AC generator (not shown). Stub shaft 14 includes a main drive polygon portion 34 which fits into a mating polygon opening 18 in the end of rotor shaft 16.

Slinger 12 includes a frusto conical portion 20 which acts as an impeller to remove oil from bearing 21 which supports the main rotor shaft 16. Slinger 12 has a plurality of channels 22 formed therein which receive pins 30 secured to stub shaft 14. Stub shaft 14 includes a spline end 32 and the polygon main drive end 34. A reduced diameter shaft shear section 36 is provided between the spline end 32 and the polygon end 34 of stub shaft 14. The spline portion 32 is driven to turn the polygon drive portion 34 and thereby drive main rotor shaft 16 of the associated generator.

Slinger 12 is attached to the main rotor shaft 16 by a snap ring 26. Sufficient clearance is provided between the inner diameter of slinger 12 and the end portion of rotor shaft 16 to allow easy installation as well as to allow relative rotational movement between slinger 12 and main rotor shaft 16. The spiral lock or snap ring 26 is installed in a groove at the end of rotor shaft 16 to secure slinger 12 to shaft 16 against axial removal but not to inhibit rotation.

A compression spring 40 is provided in the polygon end 34 of stub shaft 14 prior to installation on main rotor shaft 16. As stub shaft 14 is installed onto rotor shaft 16, polygon drive section 34 fits within a mating similar shaped opening 18 formed in rotor shaft 16. Slinger 12 is rotated to align channels 22 with pins 30. The stub shaft is moved so that pins 30 travel axially down channels 22 in slinger 12. Once the pins 30 bottom at the back of channel 22, stub shaft 14 is held in position and slinger 12 is rotated clockwise. When the pins again bottom, the stub shaft 14 is released and the stub shaft pins 30 move axially forward into the closed end of channel 22. Stub shaft 14 is now retained within the main rotor shafts that the pins are captured in the channels 22 of oil slinger 12. The outward force of compression spring 40 holds pins 30 against the dead ends of channels 22 and subsequently secures the stub shaft 14 to the main rotor shaft 16.

Orientation of channels 22 is important to preclude potential disengagement of pins 30 from channels 22 during operation. The stub shaft 14 should be driven in a direction of rotation so that the pins 30 drive the slinger 12 in a direction to maintain the pins 30 in the dead ends of channels 22. Because of the channel 22 positioning pins 30 will ultimately drive oil slinger 12 and pins 30 and oil slinger 12 will be in constant contact during operation. This will inhibit any possibility of disengagement of stub shaft 14 from main rotor shaft 16.

An advantage of the disclosed retention system 10 over some prior art devices is the elimination of a large bolt and the clearance hole through the center of stub shaft 14. Depending on the particular application it is possible that no hole is required in the center of stub shaft 14. In the embodiment shown a small hole is drilled through the center of stub shaft 14 to provide a passage for oil lubrication of the polygon drive 34. Further, there is no need for tools to install or remove stub shaft 14 from main rotor shaft 16. The disclosed construction also eliminates the possibility of losing hardware such as a nut backing off from the retaining stud during operation in a vibration environment.

I claim:

1. A quick connect apparatus for attaching a stub shaft, having a spline end, to a main shaft comprising:
   a shaped drive end formed on the stub shaft;
   a similar shaped mating opening formed in the end of the main shaft;
   a retaining device secured to the end of the main shaft against axial removal but being free to be rotated with respect to the main shaft;
   an inner diameter portion formed on said stub shaft, having a plurality of radially inward extending pins, sized to fit around a portion of said retaining device;
   a plurality of J-shaped channels formed on the outer diameter of said retaining device, sized to receive said plurality of pins: and,
   spring biasing means for biasing the stub shaft axially away from the main shaft.

2. A quick connect apparatus as claimed in claim 1 wherein:
   said retaining device comprises an oil slinger portion.

3. A quick connect apparatus as claimed in claim 1 comprising:
   a reduced diameter shear section formed on the stub shaft between the shaped drive end and the spline end.

4. Apparatus for connecting a stub shaft to a main shaft comprising:
   a rotatable retainer disposed on one end of the main shaft and held against axial removal;
   an inner diameter portion formed on the stub shaft which can fit around a portion of said rotatable retainer;
   a shaped drive portion extending axially from the stub shaft through the inner diameter portion;
   a shaped opening formed in the end of the main shaft for receiving the shaped drive portion extending from the stub shaft;
   a plurality of channels formed on said rotatable retainer, each having an opened end and a closed end circumferentially spaced from the open end:
   a plurality of pins projecting radially inward from the inner diameter portion and disposed to align with and fit into said plurality of channels when the stub shaft is connected to the main shaft: and,
   biasing means for urging the stub shaft axially away from the main shaft.

5. Apparatus as claimed in claim 4 comprising:
   snapring means disposed on the end of said main shaft for securing said rotatable retainer against removal from the main shaft.

6. Apparatus as claimed in claim 5 wherein:
   said retainer also functions as an oil slinger.

7. Apparatus as claimed in claim 6 wherein:
   said shape drive portion is a square polygon.

8. Apparatus as claimed in claim 7 comprising:
   a channel formed through the center of the stub shaft permitting lubrication to be fed to the polygon drive portion.

9. Apparatus as claimed in claim 8 wherein:
   said biasing means comprises a compression spring disposed partially within the end of the shaped drive portion of the stub shaft and engaging the back of the shaped opening formed in the main shaft.

* * * * *